US010840688B2

(12) United States Patent
Zhang et al.

(10) Patent No.: US 10,840,688 B2
(45) Date of Patent: Nov. 17, 2020

(54) SOCKET COVER, SOCKET ASSEMBLY AND ASSOCIATED MANUFACTURING METHOD

(71) Applicant: Schneider Electric (Australia) Pty. Ltd., Macquarie Park (AU)

(72) Inventors: Dahai Zhang, Shenzhen (CN); Zhen Ma, Shenzhen (CN); Pei Shang, Shenzhen (CN)

(73) Assignee: SCHNEIDER ELECTRIC (AUSTRALIA) PTY LTD, Macquarie Park (AU)

( * ) Notice: Subject to any disclaimer, the term of this patent is extended or adjusted under 35 U.S.C. 154(b) by 41 days.

(21) Appl. No.: 16/050,273

(22) Filed: Jul. 31, 2018

(65) Prior Publication Data
US 2020/0044428 A1    Feb. 6, 2020

(51) Int. Cl.
*H02G 3/14* (2006.01)
*H01R 25/00* (2006.01)

(52) U.S. Cl.
CPC ............. *H02G 3/14* (2013.01); *H01R 25/006* (2013.01)

(58) Field of Classification Search
CPC ................................ H02G 3/14; H01R 25/006
USPC ............................ 174/66, 67; 220/241, 242
See application file for complete search history.

(56) References Cited

U.S. PATENT DOCUMENTS

2013/0118771 A1* 5/2013 Tonnesen ............ H02G 3/14
                                                    174/66
2014/0182876 A1* 7/2014 Trojanowski .......... H02G 3/14
                                                    174/66

* cited by examiner

*Primary Examiner* — Angel R Estrada
(74) *Attorney, Agent, or Firm* — Locke Lord LLP

(57) ABSTRACT

Embodiments of present disclosure provide a socket cover, a socket assembly and associated manufacturing method. The socket cover comprises: a panel comprising an outer surface and an inner surface opposite to one another; a flange around the panel and extending inwardly in a direction perpendicular to the panel; and a plurality of through holes formed on the panel and having sizes and shapes matching respective socket holes of a socket module, the plurality of through holes adapted to align with respective socket holes when the socket cover is connected to the socket module.

7 Claims, 7 Drawing Sheets

SOCKET COVER, SOCKET ASSEMBLY AND ASSOCIATED MANUFACTURING METHOD

FIELD

Embodiments of present disclosure generally relate to electrical device, and more specifically, to a socket cover, a socket assembly and associated manufacturing method.

BACKGROUND

Socket assemblies embedded in the walls of buildings (such as offices, houses, etc.) are widely used. Common socket assemblies typically comprise a socket module and a socket cover. A socket cover usually comprises a panel with at least one opening or hole form thereon. The opening has a size and a shape matching a socket of a socket module. That is to say, the socket of the socket module is completely exposed from the at least one opening.

SUMMARY

Embodiments of the present disclosure provide a socket cover, a socket assembly having the same, a method for manufacturing the socket cover and a method for manufacturing the socket assembly.

In first aspect, a socket cover is provided. The socket cover comprises: a panel comprising an outer surface and an inner surface opposite to one another; a flange around the panel and extending inwardly in a direction perpendicular to the panel; and a plurality of through holes formed on the panel and having sizes and shapes matching respective socket holes of a socket module, the plurality of through holes adapted to align with respective socket holes when the socket cover is connected to the socket module.

According to embodiments of the present disclosure, the socket module is no longer entirely exposed from the socket cover. Instead, the socket module can be well shielded by the socket cover, thereby ensuring the elegant appearance. As a result, there is more flexibility for making change to the socket cover. That is, the socket cover or the properties (such as color, appearance, or the like) thereof can be easily replaced, without affecting the socket module. Moreover, the cost of maintenance can be reduced. In some embodiments, the socket cover further comprises at least one connecting component adapted to connect the socket cover to the socket module.

In some embodiments, the at least one connecting component comprises a first set of connecting elements arranged on at least one inner side of the flange and adapted to engage a second set of connecting elements of the socket module.

In some embodiments, the at least one connecting component comprises a sliding lock mechanism comprising a body coupled to at least one elastic element arranged on the inner surface of the panel, the at least one elastic element adapted to be hold the body in a locking position where a third set of connecting elements of the socket module is locked with the body; and a tongue portion adapted to insert into a first opening formed on the flange when the body is in the locking position, wherein the tongue portion is adapted to, in response to a force applied from outside of the flange, move to a release position where the second set of connecting elements are released from the body.

In some embodiments, the socket cover further comprises a set of guiding elements arranged on the inner surface of the panel, the body is adapted to move along the set of guiding elements between the locking and release positions.

In some embodiments, the at least one connecting component further comprises: a fourth set of connecting elements formed on the body and adapted to engage the third set of connecting elements of the socket module when the body is in the locking position.

In some embodiments, at least one elastic element comprises at least one of the followings: an elastic wire, a spring, and an elastic wall.

In some embodiments, the at least one connecting component comprises: a fifth set of connecting elements arranged on at least one inner side of the flange and adapted to connect the socket cover to an intermediate cover fixed on the socket module.

In second aspect, a socket assembly is provided. The socket assembly comprises: a socket module; and a socket cover according to the first aspect and adapted to detachably connect to the socket module via a connecting component. The socket assembly according to an embodiment of the present disclosure has a higher matching flexibility between the socket cover and the socket module.

In third aspect, a method for manufacturing the socket cover according to the first aspect is provided.

In fourth aspect, a method for manufacturing the socket assembly according to the second aspect is provided.

DESCRIPTION OF DRAWINGS

Drawings described herein are provided to further explain the present disclosure and constitute a part of the present disclosure. The example embodiments of the disclosure and the explanation thereof are used to explain the present disclosure, rather than to limit the present disclosure improperly.

Throughout the drawings, the same or similar reference symbols are used to indicate the same or similar elements.

DETAILED DESCRIPTION OF EMBODIMENTS

Figure 1:
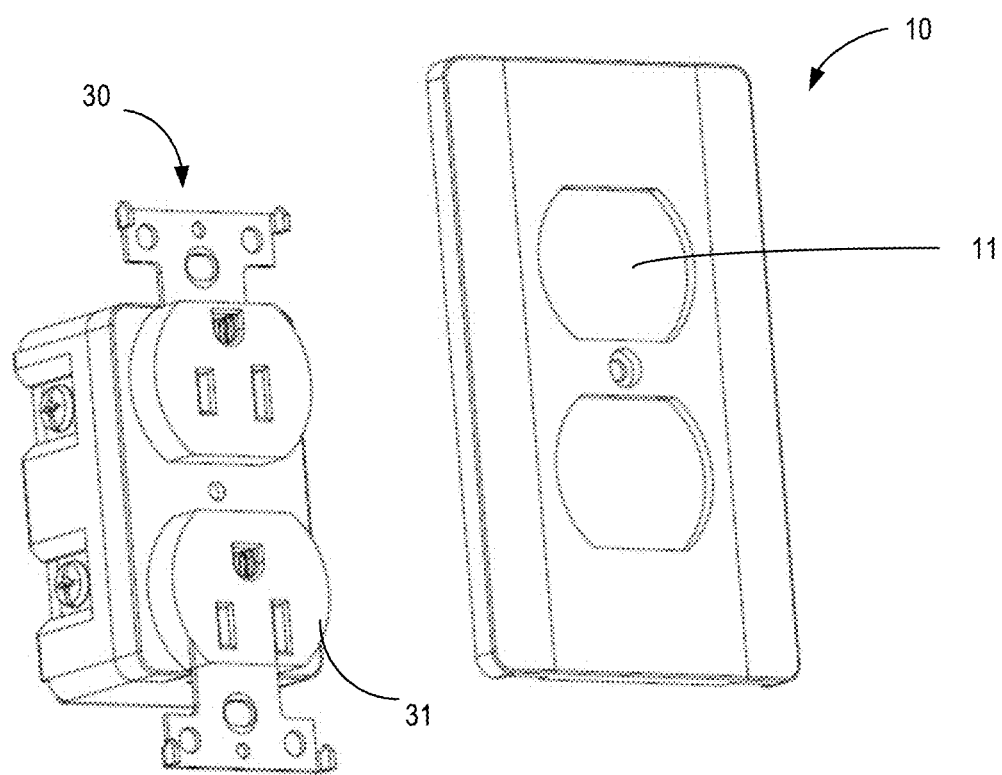
FIG. 1 illustrates a schematic diagram of a conventional socket cover 10.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below. A definition of a term is consistent throughout the description unless the context clearly indicates otherwise.

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the figures. Other definitions, explicit and implicit, may be included below.

Currently, replaceable socket covers have a wide market prospect due to the strong desire of individual requirements (such as color, material, pattern etc.). However, since the socket of the socket module is completely exposed from the opening of the socket covers, some features of the conventional socket covers are difficult to be changed as desired by the user. Therefore, the user's individual requirements for the socket assembly cannot be met.

Figure 2:
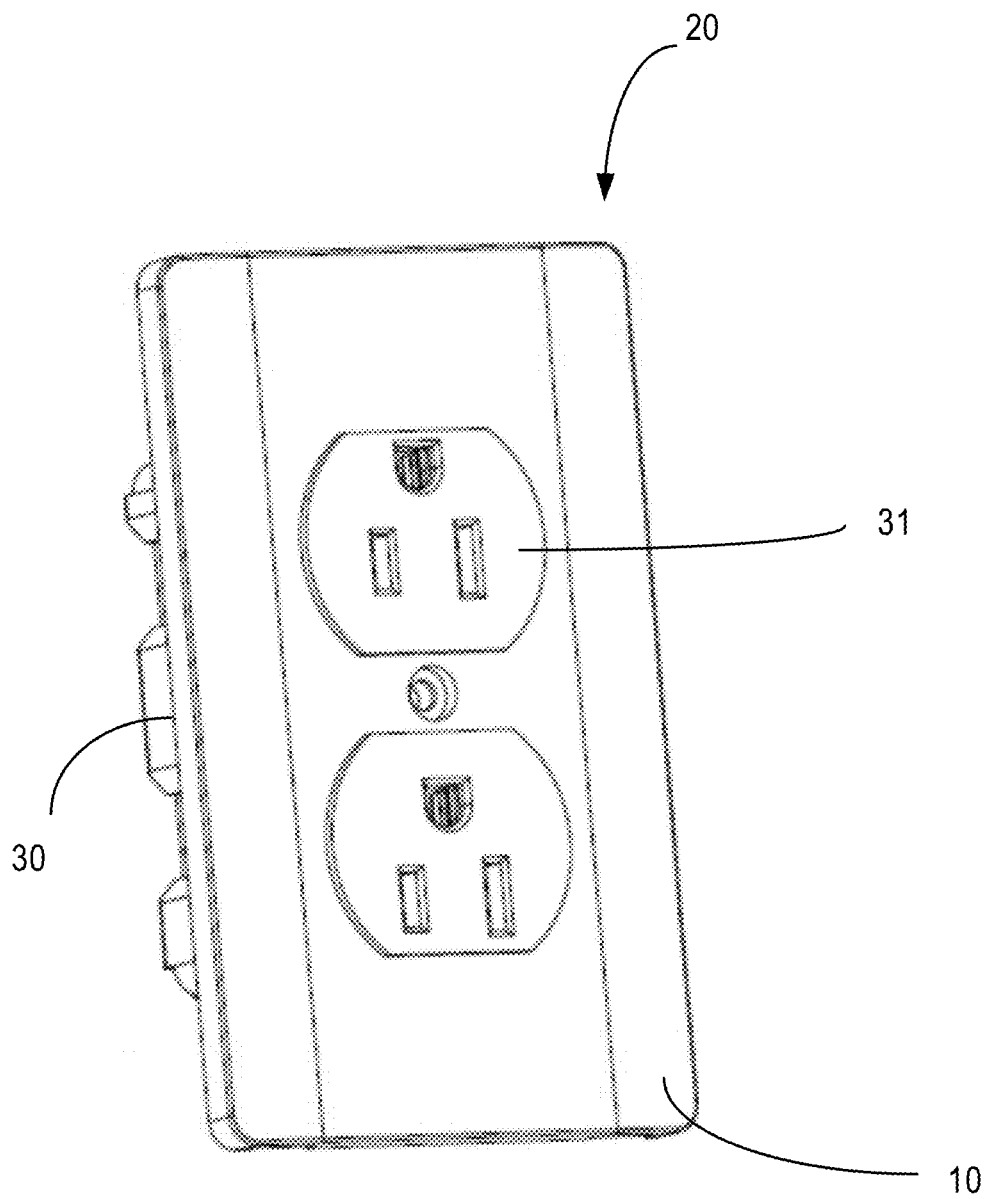
FIG. 2 illustrates a schematic diagram of a conventional socket assembly 20.

FIG. 1 illustrates a schematic diagram of a conventional socket cover 10. As shown in FIG. 1, the cover 10 comprises a plurality of openings 11 formed on the cover 10 for receiving the socket 31 of the socket module 30. FIG. 2 illustrates a schematic diagram of a conventional socket assembly 20. As shown in FIG. 2, the cover 10 is coupled to the socket module 30 such that the socket 31 of the socket module 30 is exposed from the opening 11 of the cover 10. The cover 10 is limited by the socket head of the socket module 30. As a result, an end user cannot easily make any modification to the material and/or color of the cover 10. Once the properties of the socket cover such as color, material and pattern are changed, the socket has to be changed accordingly. This decreases the user's flexibility and increase cost.

Figure 3:
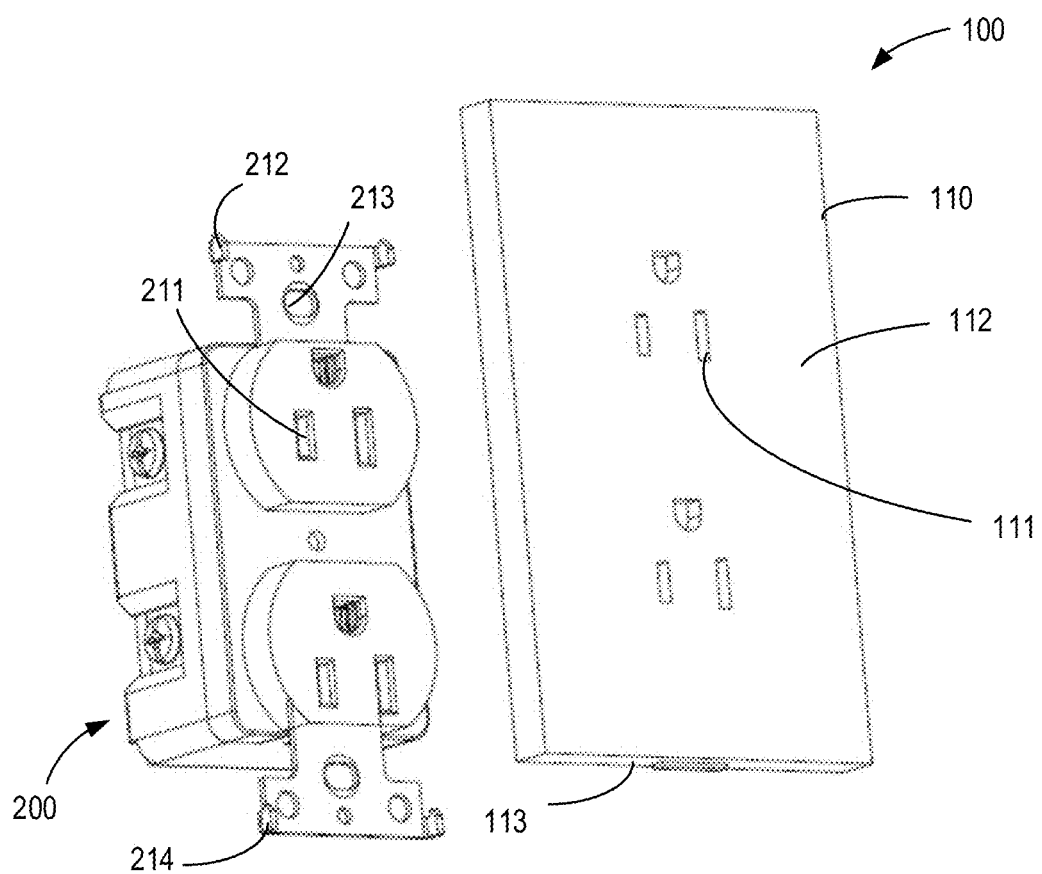
FIG. 3 illustrates a schematic diagram of a socket cover 100, in accordance with embodiments of the present disclosure.

FIG. 3 illustrates a schematic diagram of a socket cover 100 in accordance with embodiments of the present disclosure. As shown, the socket cover 100 comprises a panel 110 which has an outer surface 112 and an inner surface (not shown in FIG. 3) opposite to one another. The socket cover 100 further comprises a flange 113 around the panel and extending inwardly in a direction perpendicular to the panel.

A plurality of through holes 111 are formed on the panel 110. Different from conventional socket cover where the hole is designed to expose the entire socket module, the through holes 111 have sizes and shapes match the socket holes 211 of the socket module 200, respectively. When the socket cover 110 is connected to the socket module 200, the through holes 111 can be aligned with the respective socket holes 211 to allow pins on the plug to pass through and insert to the socket holes 211.

In this way, the socket of the socket module 200 can be shielded by the socket cover 100. This enables the user to easily change or replace the socket cover 100 or one or more properties thereof, without having any impact on the internal socket module 200. Moreover, since only a small part of the socket module 200 is exposed from the socket cover 100, when the user desires to change the color or pattern of the socket cover 100, especially replace the socket cover 100 with a different color than the socket module 200, the overall appearance can be ensured elegant compared with traditional solution where the socket module 200 is entirely exposed.

According to various embodiments of the present disclosure, the socket cover 100 comprises a connecting component to couple the socket cover 100 to the socket module 200. The connecting component can be implemented in a variety of manners in example embodiments.

For example, in some embodiments, the connecting component of the socket cover 100 comprises a first set of connecting elements 121, as shown in FIG. 3. The connecting elements 121 can be arranged on one or more inner sides of the flange 113, for example. In the example of FIG. 3, the connecting elements 121 are arranged on the inner side 1132 at the top of the socket cover 100.

It is to be understood that the arrangement shown in FIG. 3 is merely for illustration, without suggesting any limitation as to the scope of the present disclosure. For example, although only one set of connecting elements are shown, it is possible to have more connecting elements 121. Further, the first set of connecting elements 121 may also be disposed on the other inner side 1132 of the flange 113.

Accordingly, in those embodiments, the socket module 200 comprises a second set of connecting elements 212 which are adapted to be engaged with the first set of connecting elements 121, thereby connecting the socket cover 100 to the socket module 200. Examples of the first and second sets of connecting elements 121, 212 comprise, but are not limited to a snap-fit element, a magnetic connecting element, or the like. By using the connecting elements 121, 212, the socket cover 100 can be coupled to the socket module 200 in a simple and effective fashion.

Figure 4:
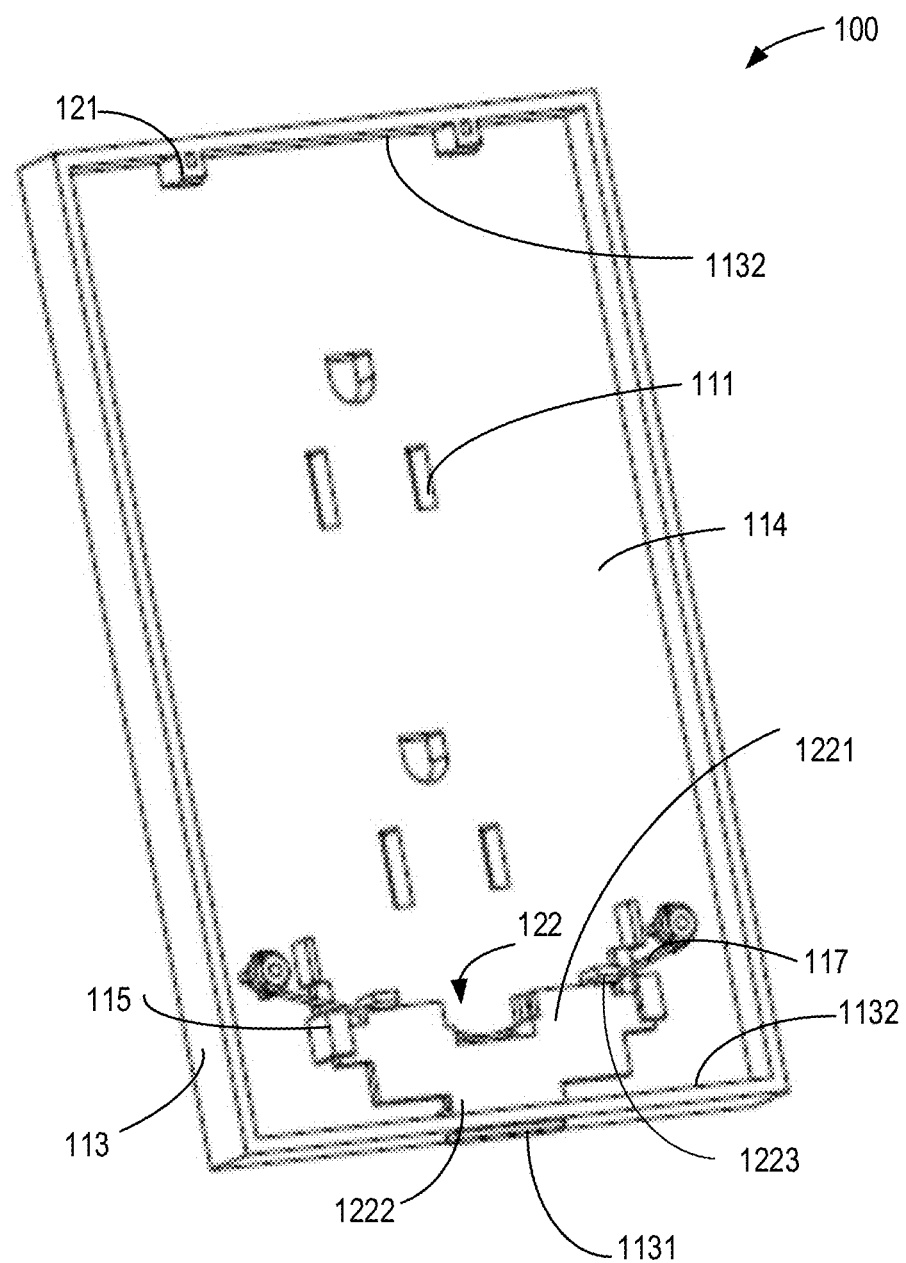
FIG. 4 illustrates a schematic diagram of inner surface of a socket cover 100, in accordance with embodiments of the present disclosure.
Figure 5:
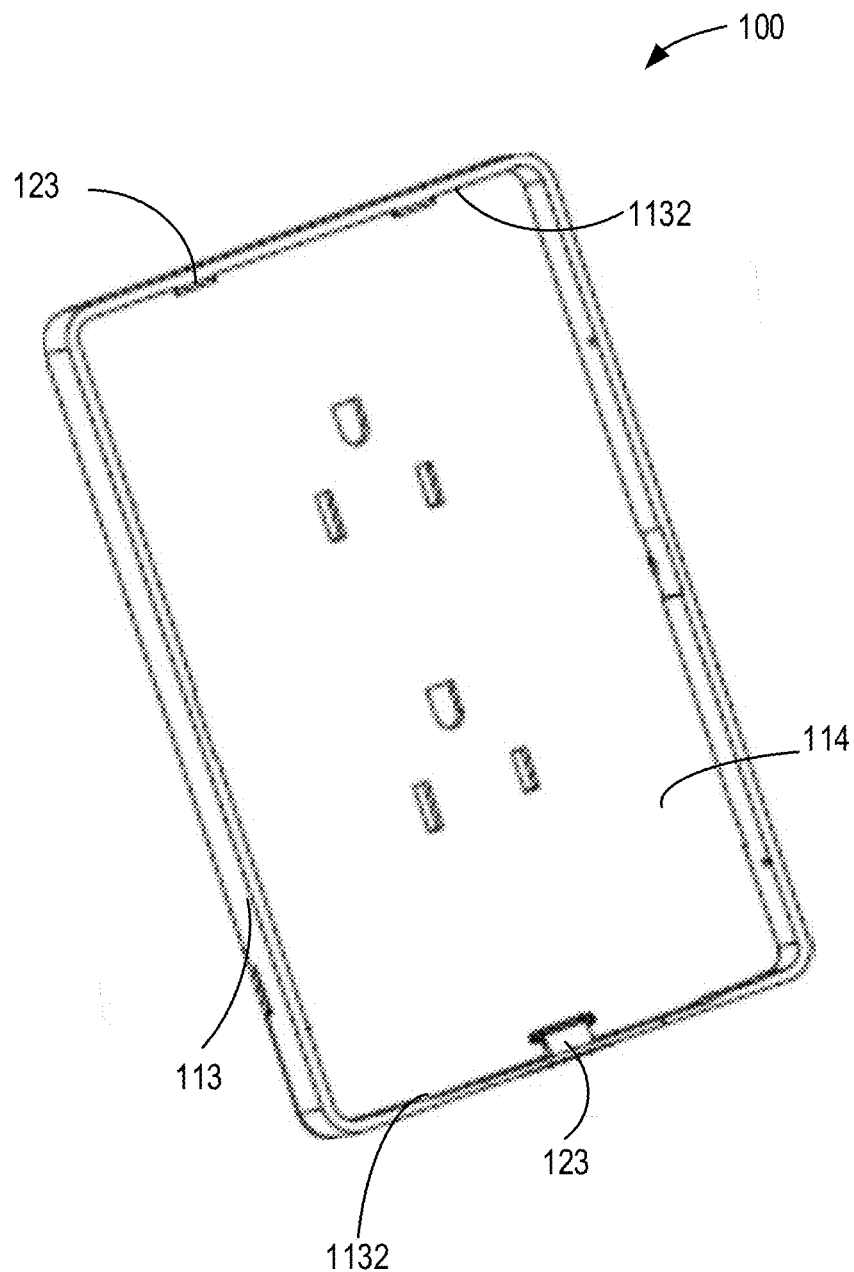
FIG. 5 illustrates a schematic diagram of inner surface of a socket cover 100, in accordance with embodiments of the present disclosure.

Alternatively, or in addition, in some embodiments, the connecting component may comprise sliding lock mechanism 122. In the example shown in FIG. 4, the sliding lock mechanism 122 is arranged at the bottom of the socket cover 100, adjacent to the lower part of the flange 113 and opposite to the first set of connecting elements 121. Other positions are possible as well.

The sliding lock mechanism 122 comprises a body 1221. There are one or more elastic elements 117 arranged on the inner surface 114 of the panel 110. Example of the elastic elements 117 comprise, but are not limited to, an elastic wire, a spring, an elastic wall, or the like.

The elastic elements 117 are coupled to the body 1221 to hold the body 1221 in a locking position. When the body 1221 is in the locking position, a third set of connecting elements 214 of the socket module 200 is locked with the body 1221, thereby fixing the socket cover 100 on the socket module 200. For example, in some embodiments, a fourth set of connecting elements 1223 are formed on the body 1221 to engage the third set of connecting elements 214 of the socket module 200.

The sliding lock mechanism 122 further comprises a tongue portion 1222. The tongue portion 1222 is adapted to insert into a first opening 1131 formed on the flange 113 when the body 1221 is in the locking position. It is to be understood that when the tongue portion 1222 is inserted into the first opening 1131 in the locked position, the end of the tongue portion 1222 may be substantially flush with or slightly protruded from the flange 113.

A user may apply a force from outside of the socket cover 100 to the tongue portion 1222 via the first opening 1131, for example, by his/her finger or a tool with tip. As such, the user may push the body 1221 to move from the lock position to a release position. When the body 1221 is in the release position, the second set of connecting elements 214 can be released from the body 1221.

In this way, the user can easily separate the socket module 200 and the socket cover 100 by using the finger to press the tongue portion 1222 without using an additional auxiliary tool.

In some embodiments, the socket cover 100 further comprises a set of guiding elements 115 arranged on the inner surface 114 of the panel 110. The body 1221 can be held in and move along the guiding elements 115 between the locking and release positions. The guiding element 115 can facilitate movement of the body 1221 to be more smooth.

It will be appreciated that in the embodiments as described above with reference to FIGS. 3-4, the socket cover 100 is directed connected to the socket module 200 in aid of the connecting component. Alternatively, in other embodiments, the socket cover 100 and the socket module 200 can be connected to each other via one or more intermediate component, as will be discussed below.

Figure 6:
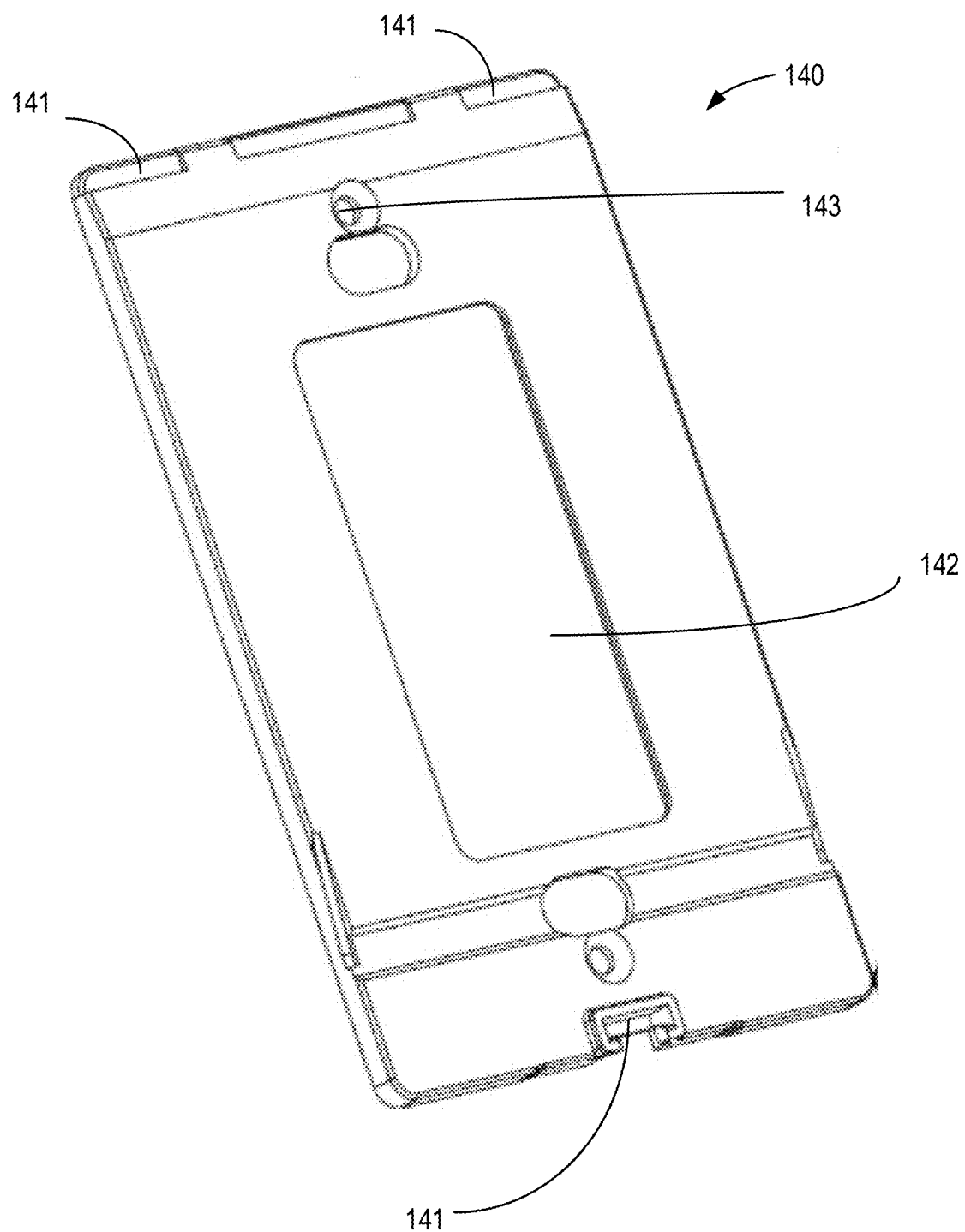
FIG. 6 illustrates a schematic diagram of an intermediate cover 140, in accordance with embodiments of the present disclosure.

FIG. 6 illustrates a schematic diagram of an intermediate cover 140 in accordance with embodiments of the present disclosure. The intermediate cover 140 can be mounted and fixed to the socket module 200. To this end, in some embodiments, the intermediate cover 140 may comprise a first set of screw holes 143 and the socket module 200 comprises a corresponding second set of screw holes 213. The screw holes 143 and 213 can be connected by screws, thereby implementing connection of the intermediate cover 140 and the socket module 200.

The socket cover 100 is adapted to be connected to intermediate cover 140. For example, in some embodiments, the connecting component of the socket cover 100 may comprise a fifth set of connecting elements 123, for example, arranged on at least one inner side 1132 of the flange 113. Accordingly, the intermediate cover 140 may comprise at least one recess 141 adapted to be engaged with the connecting elements 123. In order to allow the pins of the plug to insert into the socket module 200, the intermediate cover 140 may comprise a second opening 142 for exposing the socket of the socket module 200.

It is to be understood that the connection mechanisms as described above are merely for illustration, without suggesting any limitations as to the scope of the present disclosure. Other mechanisms can be used as well to connect the intermediate cover 140 with the socket cover 100 and/or the socket module 200.

Through the above discussions, it will be appreciated that the socket cover 100 in accordance with embodiments of the present disclosure can be replaced or changed in a very effective and efficient manner, for example, even without any auxiliary tool. Moreover, the socket cover 100 can easily meet the individual requirements of end users, without being limited by the socket module.

Figure 7:
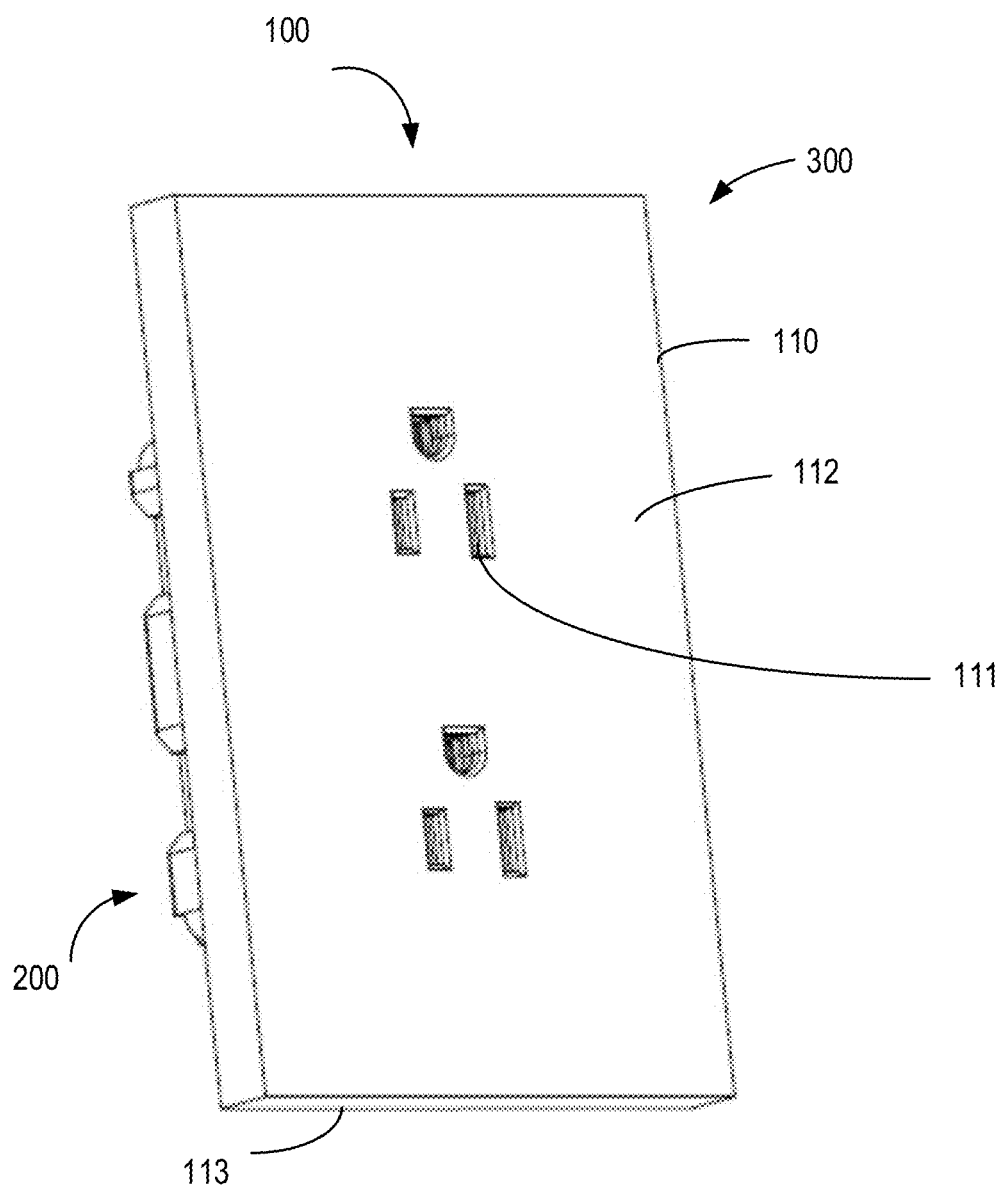
FIG. 7 illustrates a schematic diagram of a socket assembly 300, in accordance with embodiments of the present disclosure.

FIG. 7 illustrates a schematic diagram of a socket assembly 300, in accordance with embodiments of the present disclosure. As shown, the socket assembly 300 comprises a socket module 200 and a socket cover 100 as described above. The socket cover 100 is adapted to detachably connect to the socket module 200 via a connecting component. The socket assembly 300 in accordance with embodiments of the present disclosure has a higher matching flexibility between the socket cover 100 and the socket module 200.

Moreover, a method for manufacturing the socket cover as described above and a method for manufacturing the socket assembly as described above are provided.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A socket cover comprising:
   a panel comprising an outer surface and an inner surface opposite to one another;
   a flange around the panel and extending inwardly in a direction perpendicular to the panel;
   a plurality of through holes formed on the panel and having sizes and shapes matching respective socket holes of a socket module, the plurality of through holes adapted to align with respective socket holes when the socket cover is connected to the socket module; and
   at least one connecting component adapted to connect the socket cover to the socket module,
   wherein the at least one connecting component comprises a sliding lock mechanism comprising:
   a body coupled to at least one elastic element arranged on the inner surface of the panel, the at least one elastic element adapted to hold the body in a locking position where a third set of connecting elements of the socket module is locked with the body; and
   a tongue portion adapted to insert into a first opening formed on the flange when the body is in the locking position,
   wherein the tongue portion is adapted to, in response to a force applied from outside of the flange, move to a release position where a second set of connecting elements are released from the body.

2. The socket cover of claim 1, further comprising:
   a set of guiding elements arranged on the inner surface of the panel, the body is adapted to move along the set of guiding elements between the locking and release positions.

3. The socket cover of claim 1, wherein the at least one connecting component further comprises:
   a fourth set of connecting elements formed on the body and adapted to engage the third set of connecting elements of the socket module when the body is in the locking position.

4. The socket cover of claim 1, wherein the at least one elastic element comprises at least one of the following:

an elastic wire,
a spring, and
an elastic wall.

5. A socket assembly, comprising:
the socket module; and
the socket cover according to claim 1 adapted to detachably connect to the socket module via the at least one connecting component.

6. A method for manufacturing the socket cover according to claim 1.

7. A method for manufacturing the socket assembly according to claim 5.

* * * * *